United States Patent [19]

Hrusch

[11] Patent Number: 4,729,529
[45] Date of Patent: Mar. 8, 1988

[54] LANDING GEAR MECHANISM INCLUDING BYPASS VALVE ASSEMBLY FOR REDUCING DAMPING LOADS DURING TAXIING

[75] Inventor: Louis C. Hrusch, Chesterland, Ohio
[73] Assignee: Pneumo Corporation, Boston, Mass.
[21] Appl. No.: 810,578
[22] Filed: Dec. 19, 1985
[51] Int. Cl.$^4$ .......................... B64C 25/58; F16F 9/48; F16F 5/00
[52] U.S. Cl. ............................... 244/104 FP; 188/285; 267/64.26
[58] Field of Search ............... 188/285, 288, 287, 316, 188/322.15, 299, 319, 279, 284, 315; 267/64.11, 64.15, 64.22, 64.28, 64.26

[56] References Cited

U.S. PATENT DOCUMENTS

| | | | |
|---|---|---|---|
| 3,888,436 | 6/1975 | Sealey | 244/104 FP |
| 4,273,303 | 6/1981 | Somm | 188/299 X |
| 4,552,324 | 11/1985 | Hrusch | 244/104 FP |
| 4,597,548 | 7/1986 | Bergloff et al. | 244/104 FP |

Primary Examiner—Andres Kashnikow
Assistant Examiner—Robert J. Oberleitner
Attorney, Agent, or Firm—Renner, Otto, Boisselle & Lyon

[57] ABSTRACT

Landing gear mechanism includes a restrictor assembly containing a main orifice for controlling the rate of instroke of the landing gear mechanism during landing and a taxi instroke bypass valve which provides for increased flow of hydraulic fluid within the landing gear mechanism whenever the landing gear mechanism engages a bump during taxiing to reduce the damping loads that would otherwise occur if all of the hydraulic fluid were required to flow through the main orifice. The taxi instroke bypass valve assembly includes a slide member axially movable relative to the restrictor assembly for opening and closing one or more bypass orifices in the restrictor assembly. The slide member is held in the closed position whenever the landing gear mechanism is in a specified stroke range from fully extended by a secondary piston which is acted upon by the pressure in a precharged secondary chamber urging the secondary piston into engagement with a probe connected to the slide member. At some point in the strut stroke, the pressure within the upper piston chamber of the landing gear mechanism will rise to that of the precharged secondary chamber, whereby the secondary piston will be stroked along with the main strut piston and the slide member will move to the open position allowing fluid to bypass the main orifice, thereby reducing the damping loads as the landing gear mechanism negotiates bumps during taxiing.

15 Claims, 2 Drawing Figures

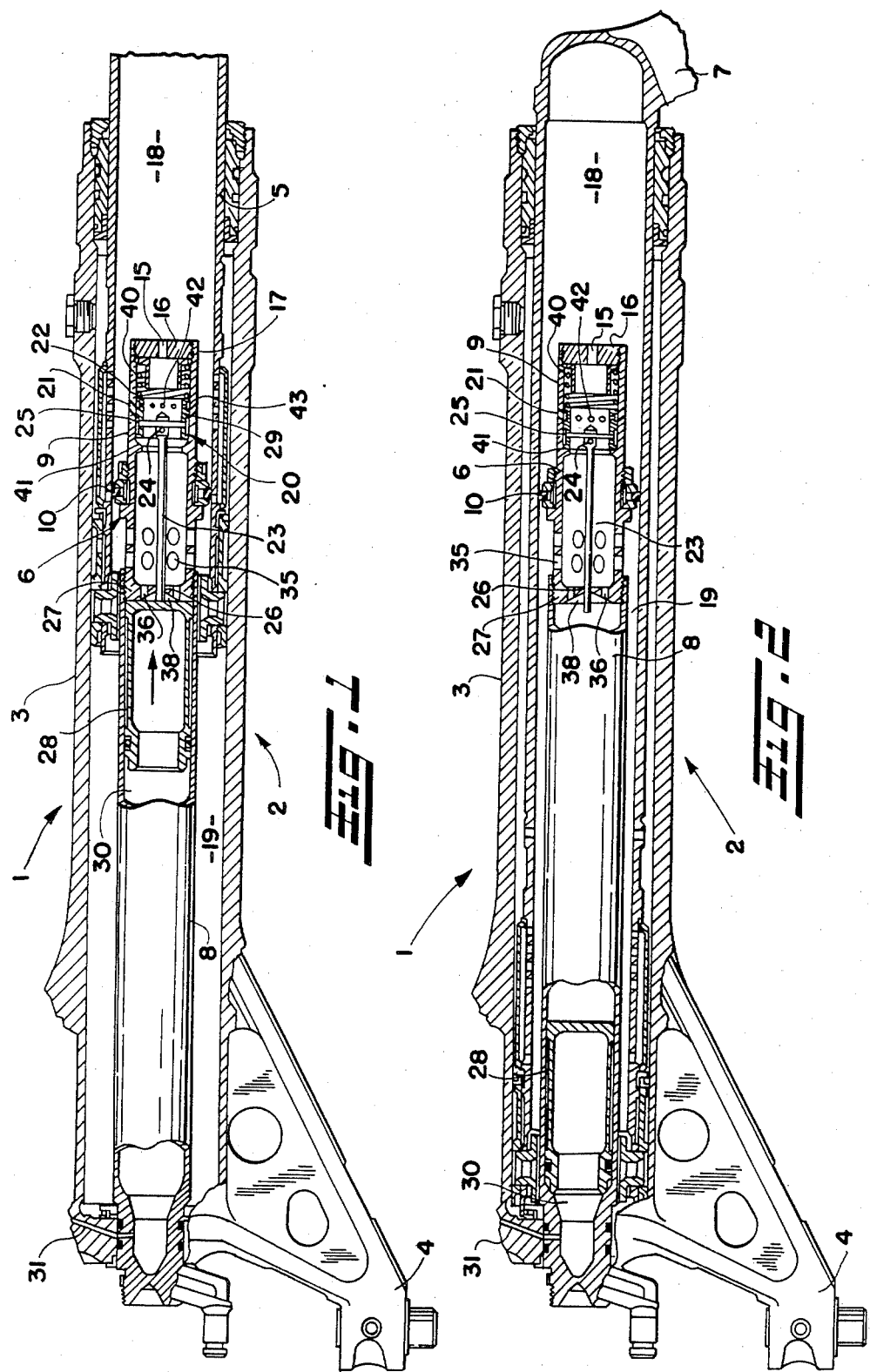

LANDING GEAR MECHANISM INCLUDING BYPASS VALVE ASSEMBLY FOR REDUCING DAMPING LOADS DURING TAXIING

BACKGROUND OF THE INVENTION

This invention relates generally, as indicated, to a landing gear mechanism including a bypass valve assembly for substantially reducing or eliminating high damping loads as the landing gear mechanism negotiates bumps during taxiing. Such a landing gear mechanism is especially designed for high performance aircraft, to permit such aircraft to operate on relatively rough runways.

Typically, landing gears for high performance aircraft such as operated by the military are not designed to operate on rough runways made rough, for example, as a result of temporary repairs to bomb damaged areas and the like.

It is possible to make a landing gear that is effective at heavy take-off weight and still provide the required shock strut stroke during landing to absorb the required amount of landing energy to prevent damage to the landing gear during landing on rough runways by providing the landing gear with different low spring rate load ranges as described in applicant's own U.S. Pat. No. 4,552,324, dated Nov. 12, 1985, the disclosure of which is incorporated herein by refernce.

The landing gear of such patent can also be made to discriminate between shock strut extension during normal ground roll and extension as the strut tire follows a sudden recess during forward travel, preventing cavitation in the lower piston chamber of the landing gear as the landing gear extends, and providing for piston rebound damping as the piston approaches the end of its stroke during full extension.

In addition, provision can be made in the landing gear of such patent for substantially reducing or eliminating high damping loads as the landing gear negotiate bumps. Briefly, this is accomplished by the opening of a taxi instroke bypass valve as soon as the landing energy stroke is complete to allow fluid to pass more freely from the lower piston chamber to the upper piston chamber, bypassing the primary flow orifice.

The landing gear mechanism of the present invention may include one or more of the various features disclosed in such patent. However, the present landing gear mechanism includes a novel bypass valve assembly for reducing or substantially eliminating the high damping loads that might otherwise take place during taxiing as the landing gear negotiates bumps which is better suited to being packaged into a smaller space than the corresponding mechanism of such patent.

SUMMARY OF THE INVENTION

With the foregoing in mind, it is a principal object of this invention to provide a landing gear mechanism generally of the type described but which includes a simplified bypass valve assembly for substantially reducing or eliminating high damping loads as the landing gear negotiates bumps during taxiing.

Another object is to provide such a landing gear mechanism in which the bypass valve assembly can more readily be packaged into a smaller space within the envelope of a standard landing gear such as the nose gear of a high performance military aircraft.

A further object is to incorporate the bypass valve assembly of the present invention within a restrictor assembly which also controls the rate of instroke of the landing gear mechanism during landing of the aircraft.

Still another object is to utilize the pressure actuated secondary air stage of a landing gear mechanism to control the opening and closing of the bypass valve assembly.

These and other objects of the present invention may be accomplished by incorporating into the restrictor assembly of the landing gear mechanism a bypass valve assembly including a slide member which is axially movable relative to the restrictor assembly for opening and closing one or more bypass orifices in the restrictor assembly. The slide member is held in the closed position whenever the landing gear mechanism is in a specified stroke range from fully extended by a secondary piston which is acted upon by the pressure in a precharged secondary chamber urging the secondary piston into engagement with a probe connected to the slide member. However, at a certain point during the instroke of the main piston after the landing energy stroke is complete, the upper piston chamber pressure within the landing gear mechanism will rise to that of the precharged secondary chamber, whereby the secondary piston will be stroked along with the main piston to provide a softer spring rate during taxiing. As the upper piston chamber pressure increases, the secondary piston will be stroked away from the restrictor assembly and out of engagement with the probe, whereupon the slide member will move to the open position allowing fluid to bypass the main orifice, thereby greatly reducing or eliminating high damping loads that might otherwise take place as the landing gear mechanism negotiates bumps during taxiing.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section through one type of landing gear mechanism including a preferred form of bypas valve assembly in accordance with this invention which permits operation on rough runways, such landing gear mechanism being shown fully extended with the bypass valve assembly in the closed position; and FIG. 2 is a fragmentary longitudinal section similar to FIG. 1, but showing the landing gear mechanism fully compressed with the bypass valve assembly in the open position.

DETAILED DESCRIPTION OF THE PREFERRED EMBODIMENT

Referring now in detail to the drawings, there is shown one form of landing ger mechanism 1 in accordance with this invention which generally consists of a main shock strut including an outer main cylinder 3 having a trunnion 4 at its upper or inboard end for connection to the aircraft fuselage in conventional manner. Suitable support struts and drag brace members, not shown, may be provided for supporting the landing gear mechanism in its down position in order to support the aircraft while on the ground and during take-off and landing and for retracting the landing gear mechanism during flight.

Axially movable within the outer main cylinder 3 is a main strut piston 5 which extends outwardly beyond the outer end of the main cylinder and has a suitable trunnion mount 7 at the outboard end thereof (see Fig. 2) for mounting a wheel and tire assembly thereon (not shown). The main strut piston 5 is generally tubular over its retracted length, to provide for relative sliding movement of a restrictor assembly 6 within the main strut piston. The restrictor assembly 6 is connected to the inboard end of the outer main cylinder 3 as by means of an orifice support tube 8 extending therebetween.

As shown, the orifice support tube 8 desirably extends a substantial portion of the length of the main cylinder 3, and provides a rigid support for the restrictor assembly 6 which is located coaxially within the main cylinder adjacent the outer end thereof and extends coaxially into the main piston 5. The restrictor assembly includes a tubular sleeve portion 9 which may be threadedly connected at its inner end to the outer end of the orifice support tube 8. Suitably mounted on the outer diameter (O.D.) of the restrictor sleeve 9 intermediate the ends thereof is a ring seal 10 having sliding sealed engagement with the inner diameter (I.D.) of the main piston 5 to prevent fluid flow therebetween.

One or more main orifices are provided in the restrictor assembly 6. In the embodiment shown, a single main orifice 15 extends through the axial center of a nut 16 threadedly received in a counterbore 17 in the outer end of the restrictor sleeve 9 to provide for restricted flow through the restrictor assembly from the lower piston chamber 18 to the upper piston chamber 19 on opposite sides of the seal ring 10 during the compression stroke of the landing gear upon landing of the aircraft. Such orifice 15 is shown as being a fixed orifice. However, it will be apparent that a variable orifice could be provided in place of the fixed orifice to control the dynamic load stroke curve of the landing gear within certain limits at different strut-stroke positions, as well known in the art.

Incorporated within the restrictor assembly 6 is a taxi instroke bypass valve assembly 20 which opens one or more bypass orifices 21 in the restrictor sleeve 9 during taxiing of the aircraft to allow fluid to pass more freely from the lower piston chamber 18 to the upper piston chamber 19, bypassing the main orifice 15, to greatly reduce or eliminate high damping loads that might otherwise take place as the landing gear negotiates bumps. In the embodiment shown, there are four such bypass orifices 21 uniformly spaced about the circumference of the restrictor sleeve 9.

The bypass orifices 21 are selectively opened and closed in accordance with the axial position of a slide member 22 within the restrictor sleeve 9. A probe 23, suitably connected to the axial inner end of the slide member 22 as by a pair of angularly disposed pins 24, 25, extends through a central opening 26 in a radial flange 27 at the axial inner end of the restrictor sleeve. When the landing gear mechanism is fully extended as shown in FIG. 1, the probe 23 is engaged by a secondary piston 28 within the orifice support tube 8 urging the slide member 22 to the position shown in FIG. 1 in which an external land 29 on the slide member is in overlapping engagement with the bypass orifice 21 blocking flow therethrough. The secondary piston 28 is part of a pressure actuated secondary air stage which assists in providing a softer spring rate for the landing gear mechanism during taxiing as described hereafter.

Between the secondary piston 28 and upper or inboard end of the orifice support tube 8 is a secondary air chamber 30 which is precharged with a desired amount of air pressure through a suitable passage 31 in the inboard end of the main cylinder 3 communicating with the secondary air chamber. When the landing gear mechanism 1 is fully extended as shown in FIG. 1, the pressure in the secondary chamber 30, being higher than that in the upper piston chamber 19, urges the secondary piston 28 into seated engagement with the inner end of the restrictor sleeve 9, forcing the probe 23 outwardly to a slight extent, until it is flush with the inner end of the restrictor sleeve 9, to move the land 29 on the slide member 22 into position blocking fluid flow through the bypass orifices 21 as aforesaid. However, fluid is still free to flow from the lower piston chamber 18 through the main orifice 15 at the outer end of the restrictor sleeve 9 on one side of the ring seal 10 into the center of the restrictor sleeve and out through a plurality of radial ports 35 in the restrictor sleeve on the opposite side of the ring seal into the upper piston chamber 19 and vice versa.

During landing, the bypass orifices 21 remain closed, whereby all of the hydraulic fluid must pass from the lower piston chamber 18 to the upper piston chamber 19 through the main orifice 15, giving full orifice landing dynamics to the landing gear mechanism during landing. However, at a certain point during the instroke of the main piston 5, the pressure in the upper piston chamber 19, which also acts on the outer end of the secondary piston 28 through axial passages 36 in the flange 27 at the inner end of the restrictor sleeve 9, will rise to that of the precharged secondary chamber 30, whereby the secondary piston will be stroked along with the main piston, thus providing a softer spring rate for the landing gear mechanism during taxiing. To increase the surface area of the secondary piston 28 exposed to the primary pressure in the upper piston chamber 19 when the secondary piston is fully seated against the restrictor sleeve 9 as shown in FIG. 1, the inner face of the restrictor sleeve flange 27 is desirably conically tapered, with the axial passages 36 through such flange communicating with the conical recess 38 formed by the taper.

As the secondary piston 28 is stroked inward (i.e. toward the left as viewed in FIGS. 1 and 2), a spring 40 acting on the outer end of the slide member 22 urges the slide member axially inwardly into engagement with an internal stop shoulder 41 on the restrictor sleeve 9 to establish communication between the bypass orifices 21 and a plurality of circumferentially spaced, radially extending passages 42 in the slide member through an external circumferential groove 43 in the slide member communicating with all of the radial passages. With the bypass orifices 21 open as shown in Fig. 2, additional fluid is free to flow from the lower piston chamber 18 through the bypass orifices to the upper piston chamber 19 for sudden compression of the landing gear to reduce the restriction instroke while taxiing on rough runways, for faster instroke of the landing gear mechanism, if necessary.

From the foregoing, it will now be seen that the runway-roughness bypass valve assembly of the present invention provides a very simple and effective means for substantially reducing or eliminating high damping loads as the landing gear mechanism negotiates bumps during taxiing. As disclosed, such bypass valve assembly may be effectively incorporated within the restrictor assembly to simplify the construction of by bypass valve assembly and facilitate packaging of the restrictor assembly and bypass valve assembly into a smaller space within the envelope of a standard landing gear such as the nose gear of a high performance militaray aircraft. Also, a simplified mechanism is provided for opening and closing the bypass valve during the respective instroke and outstroke movements of the landing gear mechanism.

Although the invention has been shown and described with respect to a certain preferred embodiment, it is obvious that equivalent alterations and modifications will occur to those skilled in the art upon the reading and understanding of the specification. The present invention includes all such equivalent alterations and modifications, and is limited only by the scope of the claims.

What is claimed is:

1. A landing gear mechanism for high performance aircraft comprising a main cylinder, a main strut piston axially movable within said main cylinder, a restrictor member contained within said cylinder and defining with said cylinder and piston upper and lower chambers, said restrictor member having orifice means therethrough for controlling the rate of flow of hydraulic fluid from said lower chamber to said upper chamber during landing, and bypass valve means providing for increased flow of hydraulic fluid from said lower chamber to said upper chamber whenever said landing gear mechanism engages a bump during taxiing to reduce the damping loads that would otherwise occur if all of such hydraulic fluid were required to flow through said orifice means, said bypass valve means comprising bypass passage means around said orifice means, a slide member mounted for axial movement relative to said restrictor member between open and closed positions for respectively opening and closing said bypass passage means, and means for keeping said slide member in the closed position until after landing has taken place and the pressure in said upper chamber has risen to a predetermined level, said means for keeping said slide member in the closed position until after landing has taken place comprising a secondary piston having a first surface area which is continually acted upon by a secondary pressure source of a predetermined magnitude urging said secondary piston toward said slide member.

2. The landing gear mechanism of claim 1 wherein said secondary piston has a second surface area which is acted upon by the fluid pressure in said upper chamber urging said secondary piston away from said slide member, the force exerted on said secondary piston by said secondary pressure source being greater than the force exerted on said secondary piston by the pressure in said upper chamber to keep said slide member in the closed position when said main strut piston is fully extended.

3. The landing gear mechanism of claim 2 wherein the pressure in said upper chamber rises to the pressure of said secondary source during compression of said landing gear mechanism after landing takes place to move said secondary piston away from said slide member, said landing gear mechanism including means for moving said slide member to the open position during movement of said secondary piston away from said slide member.

4. The landing gear mechanism of claim 3 wherein said last-mentioned means comprises a spring urging said slide member toward the open position.

5. The landing gear mechanism of claim 3 wherein said restrictor member comprises a restrictor sleeve which is maintained relatively fixed within said main cylinder, said restrictor sleeve extending into said main strut piston, said main strut piston being axially movable relative to said restrictor sleeve between fully extended and compressed positions, and seal means between said restrictor sleeve and main strut piston providing a sliding seal therebetween, said restrictor sleeve having said orifice means and bypass passage means therein, and said slide member being axially slidable within said restrictor sleeve for opening and closing of said bypass passage means in said restrictor sleeve.

6. The landing gear mechanism of claim 5 wherein said slide member has an external land thereon for blocking fluid flow through said bypass passage means when said slide member is in the closed position, and a plurality of radial passages extending through said slide member which communicate with said bypass passage means in said restrictor sleeve when said slide member is in the open position.

7. The landing gear mechanism of claim 6 further comprising an annular groove in the outer periphery of said slide member communicating with all of said radial passages in said slide member, said annular groove also communicating with said bypass passage means when said slide member is in the open position but not when said slide member is in the closed position.

8. The landing gear mechanism of claim 5 wherein said slide member has a probe extending from said slide member beyond the inner end of said restrictor sleeve for engagement by said secondary piston when the pressure of said secondary pressure source is greater than the pressure in said upper chamber to move said slide member to the closed position.

9. The landing gear mechanism of claim 8 further comprising an end flange at the inner end of said restrictor sleeve, said end flange having a central opening therein through which said probe extends.

10. The landing gear mechanism of claim 9 wherein said orifice means provides communication between the interior of said restrictor sleeve and said lower chamber on one side of said seal means, and a plurality of additional radial passages in said restrictor sleeve provide communication between the interior of said restrictor sleeve and said upper chamber on the opposite side of said seal means.

11. The landing gear mechanism of claim 10 further comprising axial passages through said end flange of said restrictor sleeve for exposing and second surface area of said secondary piston to the fluid pressure in said upper chamber through said axial and radial passages in said restrictor sleeve.

12. The landing gear mechanism of claim 11 wherein the side of said end flange facing said secondary piston is conically tapered to provide a conical recess to increase said second surface area of said secondary piston exposed to the pressure in said upper chamber when said secondary piston is fully seated against said end flange.

13. The landing gear mechanism of claim 5 further comprising an orifice support tube attached to the inner end of said main cylinder, said orifice support tube extending within said main cylinder and into the inner end of said main strut piston, said restrictor sleeve being attached to the outer end of said orifice support tube, and said secondary piston being axially movable within said orifice support tube into and out of engagement with the inner end of said restrictor sleeve.

14. The landing gear mechanism of claim 13 further comprising a secondary air chamber within said orifice support tube between the inner end of said main cylinder and said secondary piston, and means for precharging said secondary air chamber with a predetermined amount of air pressure that acts on said first surface area of said secondary piston urging said secondary piston toward the inner end of said restrictor sleeve.

15. The landing gear mechanism of claim 14 further comprising a probe extending from said slide member beyond the inner end of said restrictor sleeve for engagement by said secondary piston when said secondary piston is urged into engagement with the inner end of said restrictor sleeve by the pressure in said secondary air chamber to move said slide member to the closed position.

* * * * *